United States Patent

[11] 3,582,789

[72] Inventor John R. Mick
Scottsdale, Ariz.
[21] Appl. No. 792,494
[22] Filed Jan. 21, 1969
[45] Patented June 1, 1971
[73] Assignee Motorola, Inc.
Franklin Park, Ill.

[54] ASYNCHRONOUS DATA SIGNAL RECEPTION
5 Claims, 4 Drawing Figs.

[52] U.S. Cl. .......... 325/321, 179/15, 178/69.5
[51] Int. Cl. .......... H041 5/24
[50] Field of Search .......... 179/15, 15 A, 15 II; 178/69.5; 343/203, 205; 340/183; 325/57, 58, 321; 307/207

[56] References Cited
UNITED STATES PATENTS 2,845,613 7/1958 Pawley .......... 340/183

*Primary Examiner*—Robert L. Griffin
*Assistant Examiner*—Anthony H. Handal
*Attorney*—Mueller and Aichel e

ABSTRACT: An incoming digital signal having a pulse repetitive frequency within a given range of frequencies is compared with multiple-phase clock signals, all within such given range of frequencies. In the receiver, a plurality of channels, one channel for each phase of the multiphase clock source, are jointly responsive to the incoming digital signal and to any one of the phases to actuate the channel to an active condition and simultaneously inhibit all other channels from being jointly responsive to such digital signal and respective clock phase. Upon completion of receipt of a predetermined number of digital signals, the receiver is reset to again permit any channel to be jointly responsive to an incoming digital signal and any clock phase for actuating a channel. Detection of incoming digital signal with a clock phase other than the clock phase used to activate the channel. Such other clock phase is selected on the basis of a change of signal state of the incoming digital signal. The resultant detected signal is then supplied to a data processing circuit.

INVENTOR.
JOHN R. MICK

BY

Mueller, Aichele & Rauner

ATTORNEYS

PATENTED JUN 1 1971 3,582,789

SHEET 2 OF 2

INVENTOR.
JOHN R. MICK
BY
Mueller, Aichele & Rauner
ATTORNEYS

ASYNCHRONOUS DATA SIGNAL RECEPTION

The invention in this application was produced under a contract with the Department of the Army.

BACKGROUND OF THE INVENTION

This invention relates to digital data signal communication receivers and particularly to those receivers capable of receiving digital data signals having a slight drift of frequencies with respect to a local oscillation frequency.

Communication systems, especially radio communication systems, have been plagued for years in the detection of incoming signals, especially where the data contained in the incoming signal is received at a high rate with respect to the frequency of the signal itself. For example, one data bit per cycle or half cycle of the incoming signal frequency may be considered a high data rate. In such systems there have been attempts of utilizing carrier or incoming signal frequency derived local oscillation signals. In this manner, the local oscillator frequency signal would be phase-locked to the incoming signal. Such systems are quite often referred to as phase-lock loops. Such a system is quite satisfactory wherein all of the incoming signals are from the same source, are not subject to multiple path variations, i.e., atmospheric disturbances as well as multiple reflections from the Van Allen belts and the like. However, in many communication systems, it is desired to have a single central receiver with a plurality of remote transmitters. In using a phase-lock loop at the central receiver, the central receiver must be capable to phase-lock onto any one of the incoming signals from any one of the remote transmitters. If a phase-lock loop were to be utilized in such a network, synchronizing signals would have to be first supplied by each of the transmitters to enable the central receiver to "lock on" to the incoming signal for enabling it to successfully receive the digital data to be transmitted. This also wastes time and in a military situation permits a hostile transmitter to jam the radio network. Therefore, it is desired to provide a low cost communication network wherein there is a central receiver capable of receiving digital data signals from any one of a plurality of transmitting stations without regard to a predetermined frequency drift or phase changes as between the various transmitting stations or the central receiver. The system should be capable of handling transmissions on a random basis, i.e., initiation of the transmission should be capable of being performed by the remote station without interrogation or other form of command signals or timing supplied by a central receiver.

SUMMARY OF THE INVENTION

It is an object of this invention to provide a communication receiver capable of optimumly detecting an incoming data signal irrespective of phase relationship to a locally or otherwise generated reference signal.

A feature of the present invention is random selection of one phase of a multiphase local oscillation signal to detect an incoming digital data signal.

It is another feature of a combination in the receiver of a multiphase clock signal having a number of phases with a circuit jointly responsive to any one of the phases and an incoming data digital signal to actuate one of a plurality of channels for signal detection. Signal detection is by comparison of the incoming data signals with another one of said phases of the clock source which has an approximate orthogonal relationship to the first-mentioned phase of the clock signal.

An incoming digital data signal is supplied to a plurality of coincidence circuits. Such coincidence circuits also receive one phase of a multiphase local oscillation signal for detecting coincidence of any phase of the local oscillation signal and the incoming signal. The pulse repetitive frequency or oscillation frequency of the source generating a multiphase clock signal and of the incoming signal are approximately the same. All of the phases are repeated during each bit time of the incoming data signals. Upon detection of coincidence by one of the coincidence circuits, a signal processing channel is actuated to an active condition. Simultaneously all of the other signal processing channels are deactuated such that there is no response until a predetermined data transmission has been completed. Subsequent to the actuation of a signal processing channel, a gating system is energized and utilized to process the incoming data signals by comparison with another of the phases of the multiphase clock which is in approximate orthogonal relationship to the first-mentioned phase. The processed signals are then supplied to a data processing circuit.

Upon completion of a predetermined data transmission, the circuit is reset such that any of the signal processing channels are again made jointly responsive to an incoming data signal and any one of the phases of the clock source. A restriction on the operation is that the incoming data signals must lie within the predetermined range of frequencies and the local oscillation frequency generating the multiphase clock must also lie within that range of frequencies.

THE DRAWING

DETAILED DESCRIPTION OF AN ILLUSTRATIVE EMBODIMENT

Figure 3:
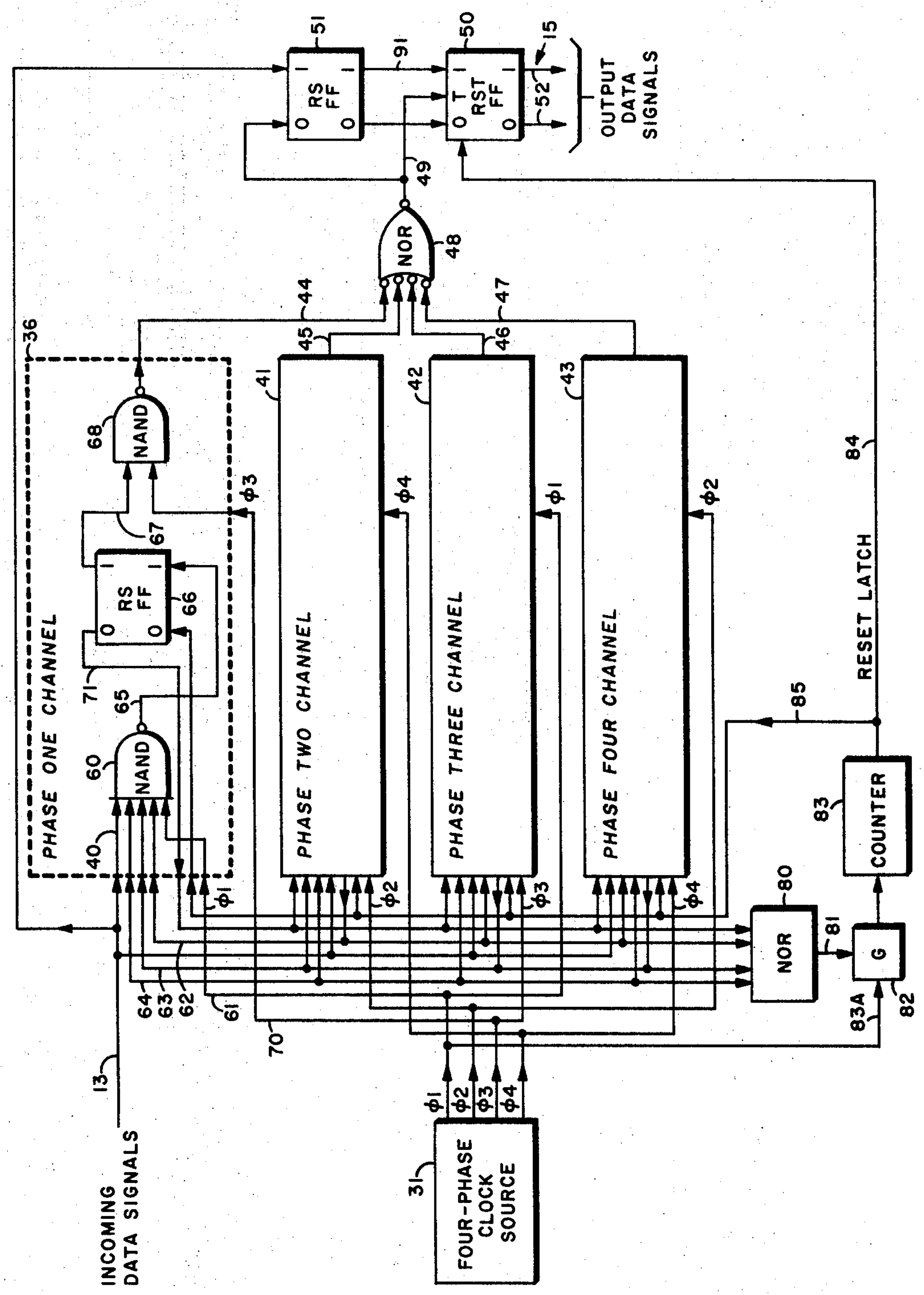
FIG. 3 is a simplified signal flow diagram of a plural channel data latch circuit utilizable in the central receiver of FIG. 1 and also illustrating a preferred operation of the present invention.

Referring now more particularly to the appended drawings, like numerals and characters indicate like parts and structural features in the various diagrams. The present system is illustrated with the utilization of four transmitters T–1 through T–4, no limitation thereto is intended. There can be two or more transmitters as will become more apparent from a reading of the present specification. It should be noted that the FIG. 3 illustrated data latch circuit utilizes four phases to detect incoming digital data signals. The selection of the number of phases has no relationship to the number of transmitters to be utilized in a communication network. Four is a design choice in both instances and appeared to be a small number suitable for illustrating the best mode of operation of the invention. Central receiver 10 is capable of receiving from any one of the remote transmitters T–1 through T–4 without resynchronizing its own oscillation generation system. The incoming data signals from any of the transmitters are intercepted by antenna 11 and supplied to a radio receiver 12 which amplifies and heterodyne detects the incoming signals in a known manner. It supplies signals over line 13 to data latch circuit 14 for detection of digital data signals contained in the line 13 signals. Data latch circuit 14 uses a locally generated oscillation signal and detects the digital data signals supplied over line 13 to then in turn supply a stream of digital data signals over line 15 to data processing circuit 16. Data processing circuit 16 may take the form of any digital data processor, a shift register which controls a visual display or the like.

Figure 2:
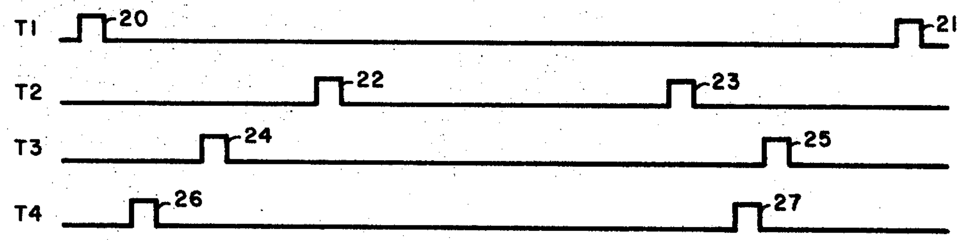
FIG. 2 is a schematized representation of transmission times of four transmitters utilized in the FIG. 1 illustrated system.

Identification of the various transmitters may be accomplished in several manners. Each of the data transmissions may contain station identifying indicia. However, this approach takes transmission time and requires the reliable detection of the station identifying indicia. Another method of identifying the transmitters T–1 through T–4 is explained with respect to the transmission times indicated in FIG. 2. The positive portions of the waveforms indicate transmission times respectively of transmitters T–1, T–2, T–3 and T–4. The repetitive frequency of transmissions of the respective transmitters is constant. For example, transmitter T–1 transmits at times 20 and 21 which in illustration is the lowest repetitive frequency of transmission. Transmitter T-2 transmits at times 22 and 23 at a much higher repetitive frequency than transmitter T-1. Correspondingly, transmitters T-3 and T-4 transmit at times 24 through 27. One requirement in the illustrative system is that the repetitive frequency of transmissions one with respect to the other stations be in a nonharmonic relationship. Each station broadcasts or emits signals in its allotted time slots or transmission times 20 through 27 as above-described. The transmission times are relatively short with respect to the period of repetition of such transmission times. That is, the permitted transmission times 20 and 21 of station T-1 has a short duration with respect to the elapsed time between two successive permitted transmission times or time slots. During each transmission time each respective station broadcasts a plurality of data signals in accordance with a predetermined schedule not important to an understanding of the present invention. The repetitive frequencies of the transmission times of the transmitters T-1 and T-4 are nonharmonically related. Therefore, the transmission times 20 through 27 precess in time one with respect to the other.

An advantage of such an arrangement is that the various local clocks or signal sources of the central station and the remote station or transmitters T-1 through T-4 need not be phase synchronized on a long term or a short term basis. Because of such possibility of simultaneous transmission, limitations may be imposed upon the change in data from one transmission time to the next such that data lost due to two stations transmitting simultaneously can be minimized. One possibility is to repeat the data transmitted a plurality of times, for example, twice. Another possibility is to change only one or two segments of the data such that the lost data by a garbled transmission can be reconstructed by the central receiver 10. For example, 90 percent of the data will be repeated a predetermined number of times such that the remaining 10 percent, if lost, could be recovered using known data processing techniques. Another approach is to transmit a sufficient number of times with sufficiently small changes such that the loss of one data point in the transmitted data is not detrimental to total system operations. Such data rates and changes are considered matters of design choice insofar as the practice of the present invention is concerned.

Each transmitter therefore transmits irrespective of transmission from the other transmitters in the communication network. Since each transmitter has its own independent frequency source, the transmitted digital data signals (In a radio network the digital data signals are carried as modulation on a carrier signal which is demodulated by receiver 12.) have random phase relationships. Therefore, data latch circuit 14 must be able to detect and receive such random phased digital data signals in a facile manner.

Figure 4:
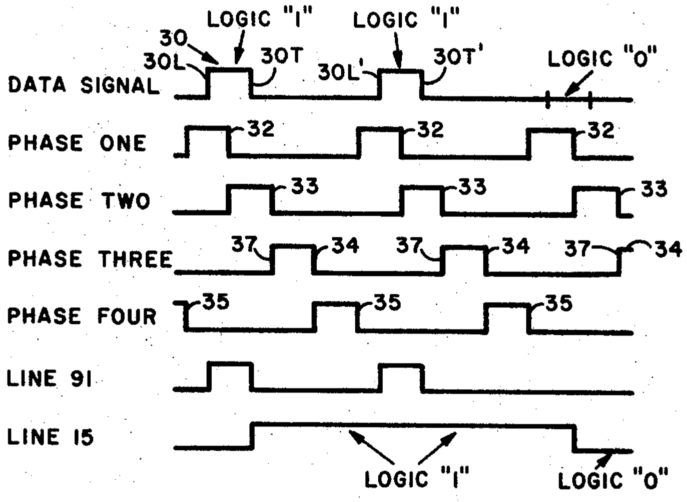
FIG. 4 is a graph illustrating a set of signal waveforms in idealized form used to describe the operation of the FIG. 3 illustrated signal processing circuit.

Referring now to FIGS. 3 and 4, the data latch circuit 14 is shown in schematic block diagram form. The idealized waveforms in FIG. 4 are utilized to describe the operation of FIG. 3 illustrated system. Referring firstly to FIG. 4, the data signals are schematically represented by waveform 30 as having a bit time between the leading edge 30L and trailing edge 30T with the next subsequent bit following immediately between 30T and 30T'. A relatively positive signal indicates a binary 1 and a relatively negative signal indicates a binary 0 or may indicate any other arbitrary information. The local oscillator in the receiver is shown as a four-phase clock 31 (FIG. 3) which has a repetitive frequency approximately equal that of the pulse repetitive frequency of the waveform 30. Each of the four phases utilized in the illustrative embodiment have a similar pulse repetitive frequency. Phase 1 is shown as the leading phase for each bit time and has a short duration positive or activating portion 32. Phase 2 has a short duration positive or activating portion 33 at 90° phase shift with respect to phase 1 positive portion 32. Similarly, phases 3 and 4 have the positive-going or activating portions 34 and 35. It is appreciated that if a different number of phases were selected, the phase difference between the successive phases would be accordingly adjusted. As shown, the leading edge 30L of data bit 30 is in time coincidence with the positive portion 32 of the phase 1 signal. As such, the data latch circuit 14 causes the phase 1 signal processing channel to process the incoming digital data. If the data signal 30 had a leading edge 30L in time coincidence with the positive portion 33 of the phase 2 signal, then the phase 2 signal processing channel is actuated to an active condition for detection of data. Similarly, the phase 3 and 4 signal processing channels can be actuated to the active condition as will become apparent.

Once a channel has been actuated, i.e., for example the phase 1 channel 36, then another phase of the four-phase clock source 31 is used to actually detect incoming data signals.

It is desired to reduce the effect of detection on missing incoming digital data signals. In accordance therewith, a phase of clock source 31 intermediate in time of the data bit is used for detection. It is remembered that all phases of the four-phase clock source 31 are repeated once during each bit time of data signal 30. In the particular illustration, phase 3 has a leading edge 37 which is in the optimum position for the detection of data, i.e., midway between leading edges 30L and 30L' of data signals 30. In accordance therewith, the phase 1 channel 36 utilizes the phase 3 signal positive portion 34 to detect the digital signals being processed by the phase 1 of channel 36.

Figure 1:
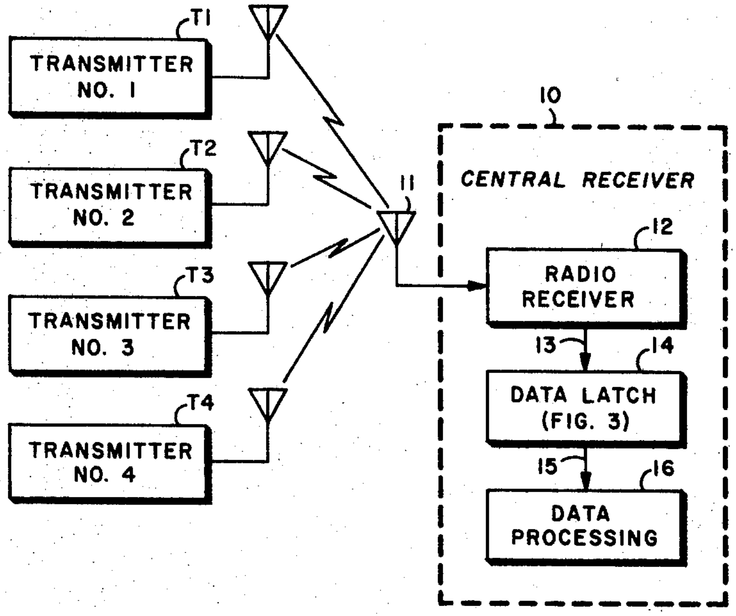
FIG. 1 is a system diagram of a communication network utilizing the teachings of the present invention.

Referring now more particularly to FIG. 3, the incoming digital data signals 30 are supplied over incoming line 13 to all the signal processing channels 36, 41, 42 and 43. All of the channels are constructed identically; for that reason, only channel 36 is described in detail, it being understood that similar connections and constructions are in the other channels 41 through 43. The outputs of the signal processing channels are supplied respectively over lines 44, 45, 46 and 47 to the inverted inputs of NOR circuit 48 which supplies an inverted output signal. With these described connections, NOR circuit 48 is an inclusive OR circuit or a linear mixer to supply a single stream of clocking signals over line 49 to the toggle input of reset-set and toggle (RST) flip-flop 50 and the input of reset-set (RS) flip-flop 51. As the clocking signals toggle flip-flop 50, the output data signals supplied over lines 52 (same as line 15 in FIG. 1) change data states in accordance with the detected incoming signals. Flip-flop 51 stretches the input data signals 30 received over line 13, that is, as shown in FIG. 4 as the line 91 signals.

Returning now to channel 36, incoming data line 40 receives the data signals from line 13 and is connected to one input of NAND circuit 60. Also connected to an input of NAND circuit 60 is the phase 1 clock line 61. The other three inputs over lines 62, 63 and 64 are from the other channels 41, 42 and 43 respectively, and carry lockout signals (as will be later described) utilized to ensure that only one signal processing channel is actuated to an active condition at a given time. Provided there are no negative lockout signals on lines 62 through 64, the coincidence of a positive signal on lines 40 and 61 causes NAND circuit 60 to emit a signal over line 65 to set RS flip-flop 66 to its "1" or active condition. Flip-flop 66 was initially reset to the "0" condition, as will be later described. Upon being set, flip-flop 66 supplies a relatively positive signal over line 67 to enable NAND gate 68 for passing phase 3 clock signals supplied over line 70 from four-phase clock source 31. As shown, the positive portions 34 of the phase 3 clock signal is approximately in the middle of the bit time between leading edges 30L and 30L' of waveform 30 to provide optimum gating by NAND gate 68 of clocking signals to line 49.

Incoming data signals (logical "ones") are applied to the set input of flip-flop 51. Outputs of flip-flop 51 are supplied to flip-flop 50 inputs. This data is shifted into flip-flop 50 by the inverted phase 3 clocking signal on line 49. Output data from flip-flop 50 is directed to the data processing circuitry over line 15 having the waveform shown in FIG. 4 for receipt of a 011 stream of data signals.

Simultaneously with supplying a positive signal over line 67 to enable NAND gate 68, RS flip-flop 66 supplies a relatively negative signal over line 71 to all of the other signal processing channels 41 through 43. The negative signal on line 71 is termed a lockout signal in that it disables the NAND gate coincidence input circuits of such channels. The lockout action is now described for signal processing channel 36 as that channel receives lockout signals from the signal processing channels 41 through 43.

Each of the individual signal processing channels receives a lockout signal from all the other channels. In the instance of signal processing channel 36, the lockout signals are received over lines 62, 63 and 64 respectively from signal processing channels 41, 42 and 43. Referring back momentarily to channel 36, it is seen that when RST flip-flop 66 is reset to the "0" or inactive condition, a relatively positive signal is supplied over line 71. This relatively positive signal indicates that the signal processing channel is an inactive condition. On the other hand, if a relatively negative signal is supplied over line 71, it indicates that the flip-flop 66 has been set to the active condition, indicating that the signal processing channel is in the active condition and no more channels should be actuated in the data latch circuit. Accordingly, when a positive signal is supplied over all of lines 62, 63 and 64 and NAND gate 60 is enabled to be responsive to coincidence of a positive signal incoming over line 13 and to a positive portion 32 of phase 1 signals supplied over line 61. If any of the other channels 41 through 43 is in the active condition, then a relatively negative signal is supplied over only one of the lines 62 through 64 to disable NAND circuit 60 preventing activation of signal processing channel 36, i.e., preventing the setting of flip-flop 66 to the active condition. With the above-described lockout system, one and only one signal processing channel 36, 41, 42, 43 is actuated to the active condition at a given time.

The clocking of the data signals into the data processing circuit 16 through data latch circuit 14 is now described. NOR circuit 80 receives signals from all the lockout lines 62 through 64 and 71. It supplies a gate control signal over line 81 to gate 82 which receives the phase 1 signals over line 83 from four-phase clock source 31. When enabled, gate 82 supplies the phase 1 signals to counter 83 which counts the phase 1 positive portion 32. In the illustrated system, each transmission time is defined as receiving a certain number of digital signals. Counter 83 is preset to count the number of digital signals. Counter 83 is preset to count the number of signals to be received during each transmission time. Upon expiration of such count, counter 83 supplies a short duration signal over line 84 termed "reset latch" to reset RST flip-flop 50. Line 84 is connected by way of line 85 to all of the channels for resetting the RS flip-flop 66 in each of the signal processing channels 36, 41, 42 and 43 to the "0" state, i.e., inactive condition. Immediately, all of the signal processing channels supply positive signals over the respective lockout lines 71 and 62 through 64.

NOR circuit 80 when receiving all positive signals, i.e., when the data latch circuit is not processing signals to data processing circuit 16, a relatively negative signal is supplied over line 81 to disable or close gate 82. However, when any one of the signals on the lockout lines becomes negative, i.e., one of the channels has been placed to the active condition, then NOR circuit 80 supplies a positive or gate enabling signal over line 81 to permit passing of phase 1 signals to counter 83.

The four-phase clock source 31 may receive a synchronizing signal from the data processing circuit 16, from the receiver 12, or may be an independent frequency source. It may be the master oscillator for the whole system in the central receiver 10. Whatever arrangement is made makes no difference so long as the drift of frequencies lies within a predetermined range. For example, the drift of less than one part per million in a 24-hour period is satisfactory for all independent oscillators or frequency sources in a system. There is an independent frequency source at each transmitter T–1, T–4 and in clock source 31.

It should be apparent to the reader of this specification that the principles of this invention may be utilized in the multireceiver-multitransmitter network wherein each station may serve as a central receiver. It is also applicable to utilization of wire lines as a replacement for polling systems. An advantage of the present system is the asynchronous operation of the transmitters and receivers.

The NAND and NOR gates discussed in this disclosure along with the positive and negative signals are for the normal definitions associated with transistor-transistor logic (TTL) or diode-transistor-logic (DTL) where the logic "one" is more positive. Needless to say, if a different logic family is used, or the definition reversed, the polarities of signals may be different. This technique may be implemented with any form of digital logic.

I claim:

1. A receiver system for use in a digital communication network for asynchronously receiving digital data signals, each having a given bit time within a predetermined range of frequencies, the improved receiver including the combination, a multiphase clock source having a frequency stability such that its fundamental frequency resides in said predetermined range of frequencies and for producing a plurality of clock signals during each said given bit times and each phase having an activating portion, a plurality of data signal processing and latching channels each for receiving incoming digital data signals, one channel for each of said phases generated by said multiphase clock source, each channel receiving one of said phases and jointly responsive to an incoming data signal and an activating portion as a clock phase signal for generating a latch signal, bistable means responsive to said latch signal for generating an active condition, a lockout signal inductive of said active condition for each of said respective channels being supplied by such channel to each and every other channel for inhibiting responsiveness of such channel to incoming data signals, gating means in each channel jointly responsive to incoming data signals, one of said clock phase activating portions and to said bistable means being in an active condition to supply a signal indicative of the incoming data signals, and signal combining means connected to all of said channels for receiving such output signals for generating a train of a data signal.

2. The subject matter of claim 1 wherein said one clock phase activating portion occurs approximately in the middle of said given bit time.

3. A digital data detection system for detecting digital signals from a plurality of sources and having substantially the same repetitive frequency with a given bit of time but asynchronous as to phase, the improvement including the combination, a multiphase clock source supplying a plurality of clock signals of different phase, each having an activating portion each of said given bit times, a like plurality of signal processing channels for receiving said digital signals and each signal processing channel receiving a different one of said clock signals and jointly responsive thereto to initiate an active condition therein for detecting said digital signals, all of said signal processing channels being responsive to said active condition in any other of said signal processing channel to inhibit its respective joint response such that one and only one signal processing channel is in said active condition at a given time, and each one of said activating portions of said clock signals having a phase relationship to at least one other of said activating portions equal to about one-half said given bit time such that said one other activating portions occurs about midway of bit times beginning about the time of occurrence of the respective each one of said activating portions and said one other activating portions being said different one of said clock signals.

4. The subject matter of claim 3 wherein each said signal processing channel supplies a lockout signal having inactive and active condition signal states indicating the deactivation or activation respectively of said signal processing channel, each channel having input coincidence means receiving said digital signals, a respective one of said clock signals and said lockout signal from all other channels and responsive to any one of said lockout signals indicating an active condition to become nonresponsive to any other of said received signals and when all said lockout signals indicating an inactive condition being jointly responsive to said respective one of said clock signals and one of said digital signals to supply a channel activating signal, means in each said signal processing channel responsive to said respective activating signals to initiate an active condition therein and cause a lockout signal to be in said active condition signal state, and gating means in each said signal processing channel jointly responsive to said active condition signal state, said different one of said clock signals and to said digital signals in the respective one of said signal processing channel to supply a train of gated digital signals in synchronism with said clock signals and indicative of said digital signals.

5. The subject matter of claim 4 further including counting means for counting a predetermined number of digital signals, detector means receiving all said lockout signals and responsive to any one of said lockout signals in said active condition signal state to supply a gate enabling signal, gating means receiving a synchronizing one of said clock signals and responsive to said gate enabling signal to pass said synchronizing one clock signal to said counting means, and said counting means being responsive to said predetermined number of said synchronizing clock signals to supply a reset latch signal to all said signal processing channels for resetting same to said inactive conditions.